Figure 1:
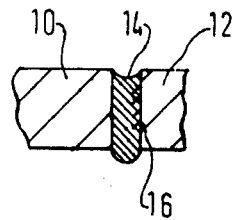

United States Patent [19]

Medlar

[11] 4,263,496
[45] Apr. 21, 1981

[54] METHOD OF WELDING BY ELECTRON BEAM

[75] Inventor: Tony Medlar, Colne, England

[73] Assignee: Rolls-Royce Limited, London, England

[21] Appl. No.: 43,422

[22] Filed: May 29, 1979

[30] Foreign Application Priority Data

Jun. 16, 1978 [GB] United Kingdom ............... 27094/78

[51] Int. Cl.³ .............................................. B23K 15/00
[52] U.S. Cl. ........................ 219/121 ED; 219/121 EU
[58] Field of Search ................. 219/121 ED, 121 EC, 219/121 EU, 121 EV, 123, 121 EW, 121 EB

[56] References Cited

U.S. PATENT DOCUMENTS

| 1,787,600 | 1/1931 | Strobel | 219/123 |
|---|---|---|---|
| 1,792,243 | 2/1931 | Richter | 219/123 X |
| 3,458,682 | 7/1969 | Best | 219/121 ED X |
| 3,944,779 | 3/1976 | Umino et al. | 219/121 ED |
| 4,194,106 | 3/1980 | Rudaz et al. | 219/123 |

Primary Examiner—C. L. Albritton
Attorney, Agent, or Firm—Cushman, Darby & Cushman

[57] ABSTRACT

A pair of superalloy workpieces are electron beam butt welded and the weld is achieved by pulsing the electron beam and, at the same time, moving it on a circular path. The combined relative traversing of beam and workpieces and circularizing of the beam, causes each pulse of electrons to overlap the metal melted by the previous pulse.

5 Claims, 12 Drawing Figures

U.S. Patent

Apr. 21, 1981

4,263,496

METHOD OF WELDING BY ELECTRON BEAM

This invention relates to electron beam welding and in particular relates to a method of manipulating the beam of electrons with which welding is effected.

It is known to butt weld two metal edges together, by passing a constant, high speed flow of electrons through the interface of the edges whilst relative linear motion is effected between the metal being welded and the gun from which the beam issues. Such a method is quite suitable for most metals. However, high tensile steels and nickel base alloys such as those used in the gas turbine engine industry, have physical and metallurgical characteristics which make it necessary to allow the beam to dwell thereon for longer periods of time than with other metals in order to obtain full penetration. It then becomes increasingly important to control the beam such that it does not dwell sufficiently long, as to displace an unacceptable amount of metal, or be removed too quickly lest it enables too rapid cooling with resultant cracking or distortion of the workpiece.

It is an object of this invention, to provide a method of welding by manipulating the beam of electrons issuing from an electron beam welding gun, such that the high tensile steel or nickel base alloy being welded thereby is welded satisfactorily.

According to the present invention, there is provided a method of electron beam butt welding two edges of a high tensile steel or a nickel base alloy workpiece, including the steps of applying a pulsed beam of electrons to the interface of said abutting edges whilst effecting relative movement between the workpiece and electron beam gun, the relationship between the beam pulse frequency and speed of relative movement being such that, each pulse overlaps that area of metal heated by the immediately preceding pulse.

Preferably, the electron beam is manipulated so as to move on a circular path about a fixed axis which is aligned with said interface.

Preferably, the diameter of the circular path is substantially equal to twice the pitch of the beam pulses.

The speed of circular motion of the beam is such as to ensure the circular path being described within that time at which the input voltage to the electron gun is at a peak.

Preferably, said circular path is described in substantially 20% of that time.

Figure 2:
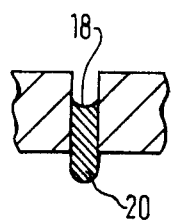
Figure 3:
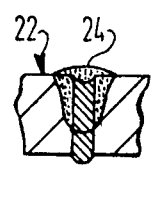

The invention will now be described, by way of example and with reference to FIGS. 4 to 12 of the drawings, FIGS. 1 to 3 representing prior art.

In the drawings, FIGS. 1 to 3 are cross-sectional views of welds achieved by known electron beam welding methods.

Figure 4:
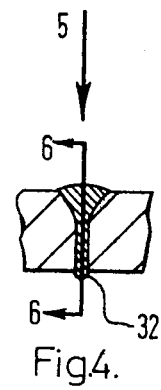
Figure 5:
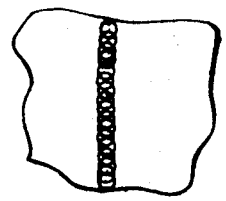
Figure 6:
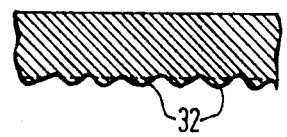
Figure 7:
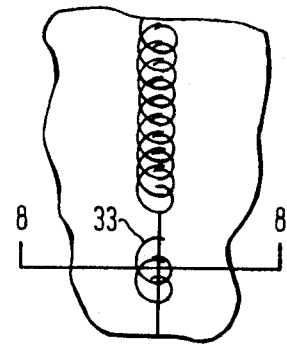
Figure 8:
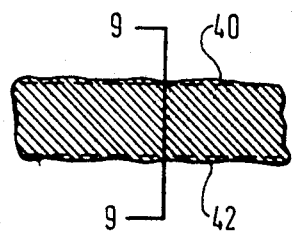
Figure 9:
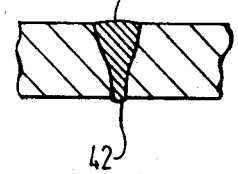
Figure 10:
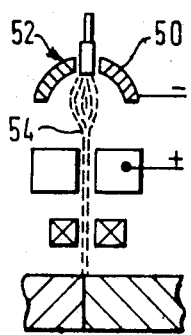
Figure 11:
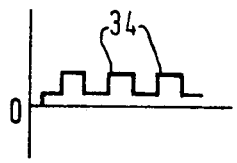
Figure 12:
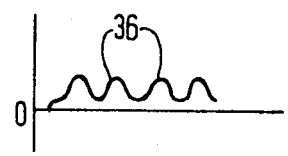

FIG. 4 is a cross sectional view through a weld form in accordance with one aspect of the present invention, FIG. 5 is a view on arrow 5 in FIG. 4, FIG. 6 is a view on line 6—6 in FIG. 4, FIG. 7 is a plan part view of a weld achieved by a further embodiment of the invention, FIG. 8 is a view on line 8—8 in FIG. 7, FIG. 9 is a view on line 9—9 in FIG. 8, FIG. 10 is a diagrammatic view of an electron beam welding gun, FIG. 11 is the profile of the voltage pulses with which beam current is varied, FIG. 12 is the profile of the current pulses passing between electron gun and workpiece.

Referring first to the prior art, in FIG. 1 two workpieces 10, 12 made from an alloy comprising nickel-iron-chromium-molybdenum-titanium, have had their abutting edges welded by the known process of electron beam welding. The process involved a single, high speed pass by the workpieces, the beam power setting being sufficient for full penetration of the workpiece metal thickness. The result is a displacing of the melted metal, indicated at 14, to a degree which is acceptable, but the rapid heating and cooling of the metal caused cracking as indicated at 16. Thus the technique was not suitable.

FIG. 2 depicts the result of a relatively low speed pass of the electron beam by the workpiece. This method obviated the cracking by virtue of the reduced rate of heat removal from the melted metal. However, the metal was maintained in the melted state so long, that an excessive amount was displaced, hence the deep channel 18 and large underbead 20.

In FIG. 3 the weld was achieved by first making a high speed pass by the workpiece, which as indicated by the numeral 22, achieved the weld of FIG. 1 and its attendant cracking, followed by a second, low speed pass whilst the electron beam power was fixed at a relatively low power valve, such full penetration of the metal thickness was, on this second pass, avoided. The partial remelting of the weld pool 24 filled the cracks, but introduced some distortion of the workpiece and again caused some displacement of metal. The overall effect was therefore unsatisfactory.

The method which is one embodiment of the invention will now be described with reference to FIGS. 4, 5, 6, 10, 11 and 12. The method comprises causing the electron beam to issue in a stream of pulses. The pulses are obtained by intermittently varying the negative bias of the grid 50 of the gun 52 (FIG. 10). The pulse frequency is matched with the speed of movement of the workpiece past the electron gun, such that each pulse of electrons overlaps the area of metal melted by the immediately preceding pulse, as depicted in FIG. 5.

The energy of the resulting pulsed beam of electrons 54, is such that full penetration is achieved by each pulse and a local underbead 32 (FIGS. 4 and 6) of acceptable proportions is formed. However, a following pulse will reheat some of the previously melted metal and form a further local bead 32 (FIG. 6) adjacent the first bead. The further bead is of slightly larger proportions, as is shown at 32 in FIG. 6 although FIG. 6 is exaggerated for reason of clarity. FIG. 4 does show however, that localised metal displacement reduces total metal displacement by a considerable amount i.e. about 50%. Moreover, the method avoided too rapid cooling of the previously melted metal and so obviated crack forming.

The invention was then further developed, by way of a successful attempt to obviate the beads formed by the local displacement of metal. This further method of achieving a weld is shown in FIGS. 7 to 9, 11 and 12 and comprises performing the operation as described hereinbefore in connection with the first method and, at the same time, rotating the beam about the longitudinal axis of the gun 52, whilst movement of the workpiece took place in a straight line, past the gun. Simultaneously rotating the beam and moving the workpiece relative to the gun, achieves the tracing of a path by each pulse, which path is in the form of a number "6". This number "6" form is indicated by the numeral 33 in FIG. 7. One rotation was achieved for each pulse of electrons and it was arranged that it occurred during the period of time at which the respective voltage input pulse to the gun was at peak value, rather than timing it to occur at peak current of the electron beam. The reason for this is made clear on reference to FIGS. 11 and 12 wherein FIG. 11 shows the controlling voltage pulses 34 put into the gun biasing grid 50 as being clean, rectangular pulses, whereas the current pulses 36 emitted by the gun are somewhat irregular in shape. It is therefore easier to achieve a constant time/voltage value factor from the input voltage, than to achieve a constant time/current value factor from the gun current output.

Experiments conducted so far, indicate that the following parameters obtained a weld as indicated in FIGS. 8 and 9 i.e. good crown 40, acceptable bead 42 and absence of cracks.

(a) Workpiece alloy of Nickel-iron-chromium, molybedenum titanium
(b) Power setting of 1.3 kw
(c) Traverse speed 6 mm/sec
(d) Pulse frequency 5 Hz for 20% peak input voltage time
(e) Diameter of rotation of beam 2.5 m.

I claim:

1. A method of electron beam butt welding to edges of a nickel base alloy part comprising the steps of:
moving the electron beam so that its point of incidence with the plane of the weld follows a generally circular path;
simultaneously causing a relative linear movement between the beam and butt joint; and
simultaneously pulsing the electron beam at a frequency insuring that each pulse of the electron beam overlaps an area of metal welded by the preceding pulse.

2. A method of electron beam butt welding according to claim 1 wherein the motions set forth in said steps of moving the electron beam and causing a relative linear movement result in the diameter of the circular path being substantially equal to twice the relative linear movement occurring between successive pulses of said electron beam.

3. A method of electron beam butt welding according to claim 2 wherein said step of moving the electron beam comprises the step of moving the electron beam with sufficient speed to form a complete circular path within the time during which an input voltage to an electron beam gun producing the electron beam is at a peak.

4. A method of electron beam butt welding according to claim 3 wherein said step of moving the electron beam comprises the step of moving the electron beam with sufficient speed to form a complete circular path within 20% of the time during which an input voltage to the electron beam gun producing the electron beam is at a peak.

5. In a method of electron beam butt welding two edges of a nickel base alloy part including the steps of moving the electron beam so that its point of incidence with the plane of the weld follows a generally circular pattern; and simultaneously causing a relative linear movement between the beam and butt joint, the improvement comprising the step of:
pulsing the electron beam at a frequency insuring that each pulse of the electron beam overlaps an area of metal welded by the preceding pulse.

* * * * *